United States Patent [19]
Simond

[11] Patent Number: 5,361,881
[45] Date of Patent: Nov. 8, 1994

[54] BREAKAWAY CLUTCH

[75] Inventor: Alfred Simond, Comber, Canada
[73] Assignee: W. Tregaskiss, Ltd., Canada
[21] Appl. No.: 165,383
[22] Filed: Dec. 10, 1993
[51] Int. Cl.⁵ .................. F16D 43/20; B25J 19/00
[52] U.S. Cl. ...................... 192/56 R; 192/150; 901/29; 901/49
[58] Field of Search ............. 192/56 R, 150; 901/29, 901/49

[56] References Cited

U.S. PATENT DOCUMENTS

| | | | |
|---|---|---|---|
| 3,488,980 | 1/1970 | Burrough | 64/30 |
| 3,638,973 | 2/1972 | Poletti | 285/184 |
| 4,514,616 | 4/1985 | Warner | 219/136 |
| 4,639,184 | 1/1987 | Knasel et al. | 414/730 |
| 4,655,674 | 4/1987 | Kohler et al. | 901/29 X |
| 4,673,329 | 6/1987 | Kato | 414/744 |
| 4,700,932 | 10/1987 | Katsuno | 901/49 X |
| 4,702,359 | 10/1987 | Mancuso et al. | 192/56 R |
| 4,714,865 | 12/1987 | Chin et al. | 901/49 X |
| 4,717,003 | 1/1988 | McCormick et al. | 192/56 |
| 4,741,642 | 5/1988 | Carlton | 901/29 X |
| 4,842,118 | 6/1989 | Puzio et al. | 192/150 |
| 4,860,864 | 8/1989 | Cwycyshyn et al. | 192/56 R |
| 4,998,606 | 3/1991 | McCormick et al. | 192/56 |
| 5,002,173 | 3/1991 | Hucul et al. | 192/150 |

FOREIGN PATENT DOCUMENTS

| | | | |
|---|---|---|---|
| 2118524 | 11/1983 | United Kingdom . | |
| 1650435 | 5/1991 | U.S.S.R. | 901/29 |

*Primary Examiner*—Andrea L. Pitts
*Attorney, Agent, or Firm*—Basile and Hanlon

[57] ABSTRACT

The present invention provides a break-away clutch for a robot end-of-arm tooling device for placement between a robot and a tooling device. The break-away clutch comprises a housing having a forward surface, a stud member, and a top plate having an underside facing surface. The housing has one end closed to form a cavity. The cavity holds a compression spring, and a piston that encapsulates the spring. The stud member has a ball end at one end resting on the piston and a distal end attached to the end-of-arm tooling device. The piston moves axially within the cavity and reacts to movement of the stud member. Notches located on the stud member, and pins located on the underside facing surface of the top plate translate rotational movement of the stud member to axial movement of the piston. A sensing device senses axial movement of the piston when the piston compresses the spring, and send a signal to the robot or end-of-arm tooling device if movement is beyond a predetermined amount.

9 Claims, 2 Drawing Sheets

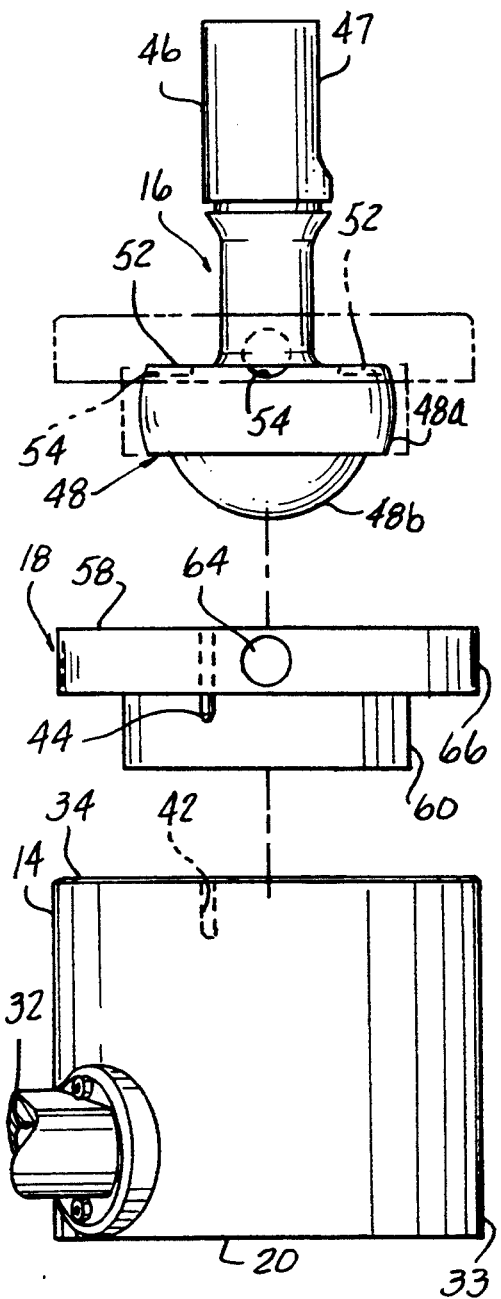
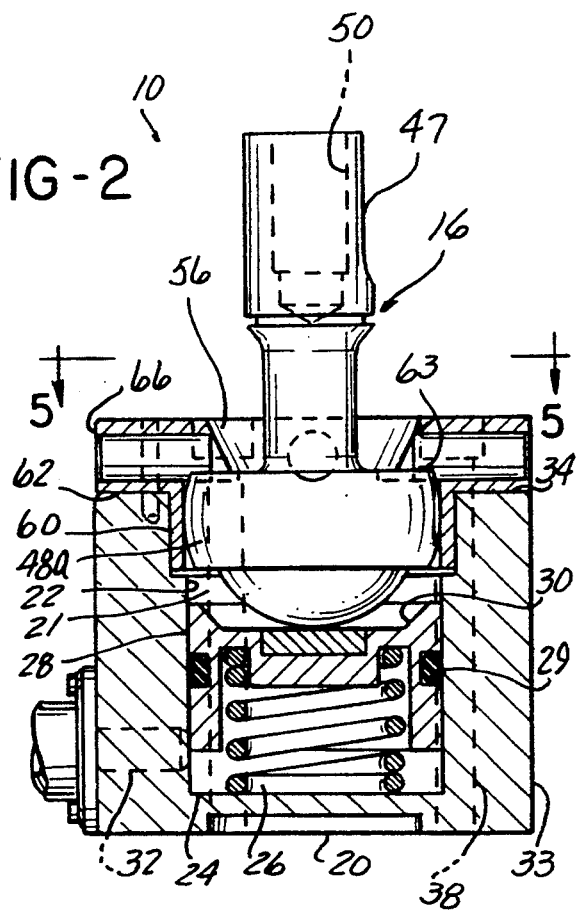
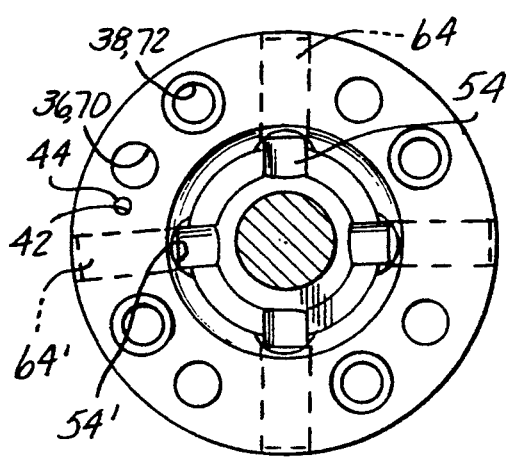

BREAKAWAY CLUTCH

FIELD OF THE INVENTION

The present invention is a clutch for connection between a robot and the attached end-of-arm tooling device such that excessive loading on the end-of-arm tooling device can be detected before damage to the robot, equipment or tooling.

BACKGROUND OF THE INVENTION

Breakaway clutches are interposed between a robot and an attached end-of-arm tooling device. The purpose of the breakaway clutch is to provide protection to the robot if excessive loading or stress is placed on the end-of-arm tooling device. Excessive loading on the attached end-of-arm tooling device can be the result of a malfunction of the robot, the introduction of an improper foreign object, or a programming error. If excessive loading is experienced, the breakaway clutch will immediately shut down the robot to avoid damage to the robot, equipment or tooling.

It is an object of this invention to provide in a small compact breakaway clutch a means to detect displacement in the three axis directions. It is also an object of this invention to sense rotational displacement.

SUMMARY OF THE INVENTION

The breakaway clutch includes a stud member having a rod and a semi-spherical ball end encapsulated in a housing cavity between a piston and a top plate. The piston is capable of movement within the housing and reacts to movement of the stud member. The piston is biased by a spring means. A sensing device detects movements of the stud member against the piston. The stud member is mounted at the rod end to the end-of-arm tooling device allowing for pivotal movement of the semi-spherical ball end if the end-of-arm tooling device is loaded beyond a predetermined amount causing the stud member to pivot.

The housing, top plate, and stud member are constructed so that in assembly the components must be joined in a particular configuration. The housing body has a forward surface abutting a facing surface of the top plate. A dowel hole is located in the forward surface of the housing body for receiving a dowel pin located on the facing surface of the top plate. The dowel pin and hole align the housing and the top plate. Additionally, the top plate has a plurality of pins exposed radially from the facing surface of the top plate. The plane surface of the ball end of the stud member includes a plurality of matching notches about its circumference that coincide with the pin ends of the top plate. The plurality of pins and notches are configured so that there is only one correct matching assembly of the breakaway clutch. This unique configuration also provides a means to detect rotational stress on the end-of-arm tooling device. If a pin end on the top plate is forced out of a notch on the ball end of the stud member, the stud member displaces the piston that is detected by the sensing device.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is an exploded side view of the breakaway clutch showing a housing, top plate and stud member according to the preferred embodiment of the present invention;

FIG. 2 is a sectional view of the assembled breakaway clutch showing the clutch in a normal position;

FIG. 5 is a plan view of the breakaway clutch of FIG. 2 taken along lines 5—5.

DESCRIPTION OF THE PREFERRED EMBODIMENT

Figure 4:
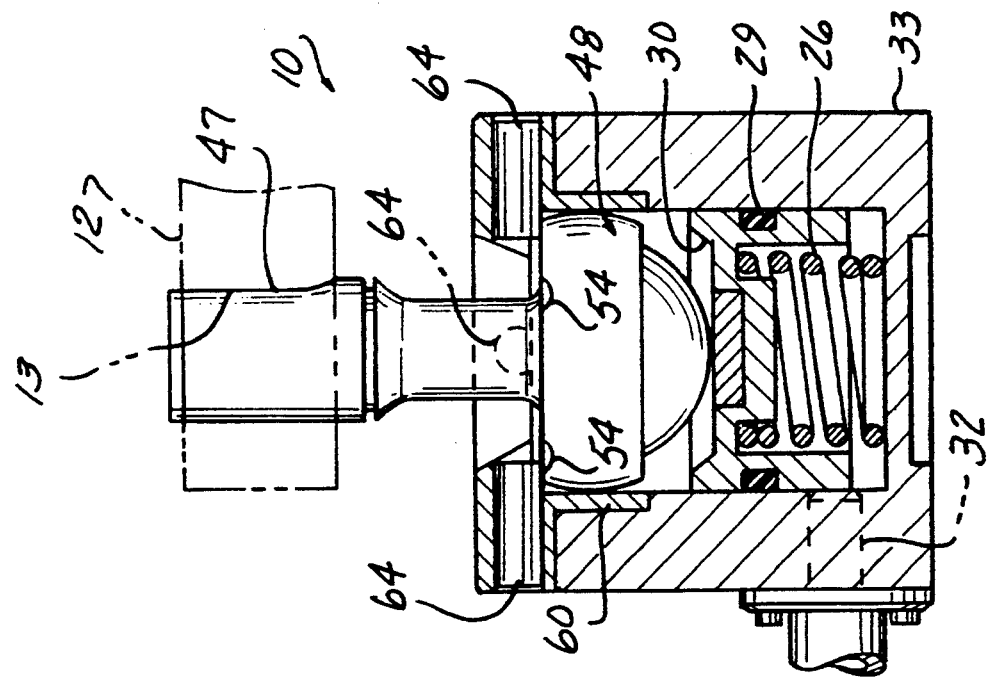
FIG. 4 is a sectional view of the assembled breakaway clutch showing a rotational overload position of the clutch.
Figure 3:
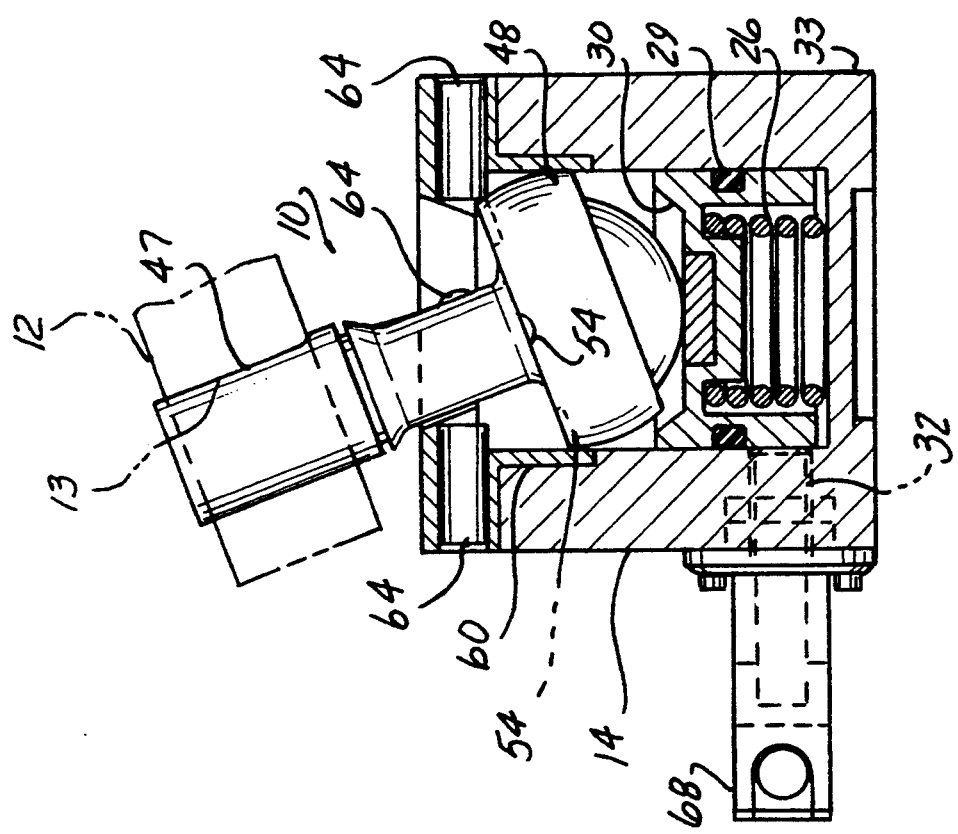
FIG. 3 is a sectional view of the assembled breakaway clutch showing the overload position of the clutch resulting from a force from one of the three axis directions.

Referring to the drawings, a breakaway clutch 10 is used to detect malfunctions in robotic machinery. The breakaway clutch 10 of the preferred embodiment is located between a robot arm (not shown) and an end-of-arm tooling device 12 (FIGS. 3 and 4). Externally, the breakaway clutch 10 comprises a cylindrical housing 14, a stud member 16, and a top plate 18. The cylindrical housing has one end 20 closed to form a cavity 21 having an interior sidewall 22 and a rear end wall 24. The housing cavity 21 holds a compression spring 26, a piston 28, and an O-ring 29. The piston 28 encapsulates the spring 26 against the rear end wall 24. The piston 28 is adaptable to move axially along the interior sidewall 22 within the cavity 21 while the spring 26 biases the piston 28 to a normal position. The outer end 30 of the piston 28 is shaped as an inwardly tapered end wall 30 adaptable for joining with the stud member 16. A proximity sensor 32 (shown in FIG. 3) enters the housing 14 through a lower outer wall 33 near the spring 26. The proximity sensor 32 is capable of sensing movement of the piston 28 within the housing cavity 21. The housing 14 has an exterior forward surface 34 mating with the top plate 18. The forward surface 34 of the housing 14 has a plurality of through apertures 36 spaced circumferentially around surface 34 and extending axially through the cylindrical housing 14. Adjacent to each threaded aperture 36 on the forward surface 34 are through apertures 38 for bolting the breakaway clutch 10 to robotic machinery. The forward surface 34 of the housing 14 also includes a dowel hole 42 for receiving a dowel 44 located on the top plate 18 during assembly.

The stud member 16 comprises a rod 46 and a ball end 48. The rod 46 is held about its circumference to the end-of-arm tooling device 12 during use. To align the breakaway clutch 10 to the end-of-arm tooling device 12, the rod has one side 47 partially flattened to coincide with a flattened surface 13 of the end-of-arm tooling device 12. The rod 46 has a center threaded aperture 50 adaptable for connection to a tool alignment checking device (not shown) for measuring distortion if needed. The ball end 48 is semi-spherical in shape and has dual radial surfaces. The upper radial surface 48a has a radial dimension such that the surface 48a is adjacent the interior of a forward cavity wall 60 of the top plate 18. The lower radial surface 48b rests against the inwardly tapered end wall 30 of the piston 28. The use of a dual radial ball end 48 reduces the overall dimension of the breakaway clutch assembly 10.

Adjacent to the upper radial surface 48a the ball end has a plane surface 52. The plane surface 52 of the ball end 48 has a plurality of notches 54 around its circumference. The notches 54 are spaced to coincide with pins 64 located on the top plate 18.

The top plate 18 is a circular plate having a concentric aperture 56. The top plate 18 includes an exposed face 58, a forward cavity wall 60 and an underside exterior facing surface 62 and an underside interior facing surface 63. The exterior of the forward cavity wall 60 is sized to fit snugly against the cavity interior sidewall 22 of the housing 14. The underside exterior facing surface 62 is sized to set flush against the forward surface 34 of the housing 14 when assembled. A plurality of threaded apertures 70 and through apertures 72 coinciding with apertures 36 and 38 in housing 14 extend circumferentially about the concentric aperture 56. Pins 64 are radially spaced about the top plate 18 and enter at a sidewall 66. The depth of the top plate 18 from the exposed face 58 to the underside interior facing surface 63 is less than the depth of the top plate 18 from the exposed face 58 to the underside exterior facing surface 62. Therefore a portion of each pin 64 is exposed at the underside interior facing surface 63 and not exposed at the underside exterior facing surface 62. The pins 64 are numbered and positioned to coincide with the notches 54 on the ball end. As seen in FIG. 5, the preferred embodiment has four pins 64 and notches 54. Three of the pins 64 and notches 54 are set at 90° intervals from each other. The fourth pin 64' and notch 54' are offset from this 90° interval for reasons described later. A dowel 44 extends from the underside exterior facing surface 62 of top plate 18 for insertion into the dowel hole 42 of the housing 14.

The top plate 18 restrains the ball end 48 of the stud member 16 in the cavity 21 of the housing against the piston 28. The rod 46 extends through the concentric aperture 56 in the top plate 18.

In assembling the breakaway clutch 10, the offset configuration of the pins 64 and notches 54 requires that the ball end 48 of the stud member 16 must align to the top plate 18 in only one configuration in order to match the pins 64 and notches 54. The top plate 18 slides over the rod 46 onto the housing 14 and encapsulates the ball end 48 against the piston 28 within the cavity 21 of the housing 14. The pins 64 must correspond to the notches 54. The dowel 44 and dowel hole 42 act as a guide to align the top plate 18 with the housing 14. As a result, the pins 64 rest within notches 54 and ball end 48. As explained supra, three sets of notches 54 and pins 64 are spaced at 90° intervals around the circumference. The fourth set of notch 54' and pin 64' is offset from the 90° interval to assist the alignment of the breakaway clutch 10 to the end-of-arm tooling device and the robot arm. Once the breakaway clutch 10 is assembled, the top plate 18 is threadably attached to housing 14 via conventional means in apertures 36 and 70. The breakaway clutch 10 can then be attached to the robot arm via conventional means in the through holes 38 and 72 extending from the top plate 18 through the housing 14. The breakaway clutch is attached to the end-of-arm tooling device 12 via clamping means on the exterior surface of rod 46. To facilitate the correct orientation of the breakaway clutch 10 to the end-of-arm tooling device 12, the flattened surface 47 of the rod is aligned to a corresponding flattened surface 13 on the end-of-arm tooling device 12.

Movement of the stud member 16 from the normal position, as shown in FIG. 2 to an askew position as shown in FIG. 3, resulting from an interference, is sensed by way of the proximity sensor 32 fixed to an electrical connector 68. In FIG. 3, stud member 16 and piston 28 have moved in the direction of the rear wall 24 of the housing 14 to an extent that the spring 26 has compressed and moved inwardly. When the spring 26 compresses inwardly due to the movement of the piston 28 beyond a predetermined amount, the electrical connector 68 sends an alarm signal to the robot controller.

Additionally, as seen in FIG. 4, if the end-of-arm tooling device 12 experiences rotational interference such that the interference forces the notches 54 of the ball end 48 of the stud member 16 to shift, the pins 64 of the top plate will no longer rest in the notches 54. The force of the pins 64 of the top plate 18 against the plane surface 52 of the ball end 48 will force the stud member 16 to move downwardly into the cavity 21 of the housing 14, moving the piston 28 downward and thereby compressing the spring 26. In this manner, the alignment means comprising the notches 54 and pins 64 translate rotational movement to axial movement. If the compression of the spring 26 is beyond a predetermined amount, the movement will be sensed by the proximity sensor 32. The electrical connector 68 will likewise send an alarm signal to the robot controller. Thereby, this invention provides a small compact breakaway clutch having the capability of sensing motion in the X, Y and Z directions as well as sensing motion of a rotational nature.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A breakaway clutch for an end-of-arm tooling device, said clutch comprising:
   a cylindrical housing, having one closed end forming a cavity, said cavity having a rear end wall;
   a stud member, comprising:
   a rod releasably connected to the end-of-arm tooling device, and a ball end;
   a compression spring located in the cavity at the rear end wall;
   a piston in the cavity capable of axial movement, said piston encapsulating the spring against the rear end wall, wherein the spring biases the piston to a normal position;
   a top plate for restraining the ball end in the cavity against the piston;
   a means for aligning the clutch to the end-of-arm tooling device;
   a means for connecting the clutch to the end-of-arm tooling device;
   a means to translate rotational movement of the stud member to axial movement of the piston; and
   a means for sensing axial movement of the piston in other than the normal position.

2. A breakaway clutch for an end-of-arm tooling device, comprising:
- a cylindrical housing having one end closed thereby forming a cavity along an interior sidewall and end surface, said housing having an exterior surface;
- a piston located within the housing cavity and capable of axial movement along the interior sidewall, said piston having an inwardly tapered internal end wall;
- a compression spring biasing the piston to a normal position;
- a sensing means for sensing movement of the piston in other than said normal position;
- a stud member having a rod at one end and a ball end at a distal end, said rod releasably connected to the end-of-arm tooling device, said ball end engaging with the inwardly tapered internal end wall of the piston;
- a circular top plate having a concentric aperture, a cavity wall, a side wall, an underside exterior facing surface, an underside interior facing surface and an exposed face; and
- an alignment means for aligning the housing, stud member, and the top plate together, whereby the alignment means provides a means to translate rotational movement of the stud member to axial movement of the piston.

3. The alignment means of claim 2 comprising:
- a notch located on the ball end of the stud member; and
- a pin located on the underside interior facing surface of the top plate, wherein the pin rests in the notch.

4. The alignment means of claim 2 wherein a plurality of the radial pins located on the underside interior facing surface of the top plate are spaced at equidistant intervals and a single radial pin is spaced offset from the equidistant interval.

5. The alignment means of claim 4 further comprising a plurality of notches on the ball end spaced to correspond with the plurality of radial pins.

6. The breakaway clutch of claim 2 wherein the cavity wall of the top plate is sized to fit snugly against the interior sidewall of the housing, and the underside facing surface of the top plate is sized to set flush against the exterior surface of the housing.

7. A breakaway clutch for an end-of-arm tooling device, comprising:
- a cylindrical housing having one end closed thereby forming a cavity along an interior sidewall and end surface, said housing having an exterior surface, the exterior surface having a dowel hole;
- a piston located within the housing cavity and capable of axial movement along the interior sidewall, said piston having an inwardly tapered internal end wall;
- a compression spring biasing the piston to a normal position;
- a sensing means for sensing movement of the piston in other than the normal position, said sensing means communicating to an electrical connector, wherein the electrical connector sends an alarm if movement is beyond a predetermined amount;
- a stud member having a rod at one end and a ball end at a distal end, said rod threadably connected to the end-of-arm tooling device, said ball end engaging with the inwardly tapered internal end wall of the piston;
- a circular top plate having a concentric aperture, a cavity wall, a side wall, an underside exterior facing surface and an underside interior facing surface, and said underside exterior facing surface having a dowel extending therefrom, wherein the cavity wall of the top plate is sized to fit snugly against the interior sidewall of the housing, the underside exterior facing surface of the top plate is sized to set flush against the exterior surface of the housing, and said dowel hole in the exterior surface is sized for receiving the dowel from the underside exterior facing surface of the top plate;
- an alignment means for aligning the stud member and the top plate together, said alignment means comprising:
  - a notch located on the ball end of the stud member; and
  - a pin located on the underside interior facing surface of the top plate, wherein the pin rests in the notch when the piston is in said normal position.

8. The ball end of claim 7 comprising an upper radial surface and a lower radial surface, wherein the upper radial surface has a radial dimension such that the upper radial surface is adjacent to the cavity wall, and the lower radial surface engages with the inwardly tapered internal end wall of the piston.

9. The stud member of claim 7 wherein the rod has one side partially flattened for proper alignment to the end-of-arm tooling device.

* * * * *